United States Patent [19]

Sherratt

[11] Patent Number: 4,646,793

[45] Date of Patent: Mar. 3, 1987

[54] COOKING OIL DISTRIBUTION AND GREASE COLLECTION AND DISPENSING APPARATUS AND METHOD

[75] Inventor: James K. Sherratt, Redlands, Calif.

[73] Assignee: Advantage Food Systems, Inc., Sunnymead, Calif.

[21] Appl. No.: 637,149

[22] Filed: Aug. 2, 1984

[51] Int. Cl.[4] .............................................. A47J 37/12
[52] U.S. Cl. ........................................ 141/1; 99/403; 137/358
[58] Field of Search ............... 99/403; 141/1, 82, 231, 141/311 R; 137/1, 358

[56] References Cited

U.S. PATENT DOCUMENTS

| 2,587,939 | 3/1952 | Webb | 99/403 X |
| 3,787,594 | 1/1974 | Palmason | 99/403 X |
| 4,360,046 | 11/1982 | Streit et al. | 141/231 X |
| 4,485,831 | 12/1984 | Ungerleider | 137/1 |

OTHER PUBLICATIONS

Collectramatic Shortening Filter brochure Teal Combo publication.

Render magazine, "Grease Theft Hotline", article Apr., 1984.
Render magazine, "Grease Processing on the Go", Apr. 19, 1984, by Frank Burnham.

*Primary Examiner*—Charles E. Phillips
*Assistant Examiner*—Mark Thronson
*Attorney, Agent, or Firm*—Stetina and Brunda

[57] ABSTRACT

A cooking oil and grease recycling apparatus for collecting hot cooking oil from fryer vats in restaurants and industrial food preparation companies and replacing it with fresh oil or grease. Holding tanks connected to the frying vats by pipping, which includes valves and pumps to permit the used oil or grease from the frying vats to flow into a holding tank. The holding tanks are in a location accessible for trucks to connect a hose for pumping the used liquid oil or grease into the truck tank. A second hose is connected from the truck tank to pump new, fresh oil or grease into a distribution tank which are mounted above the frying vats at any convenient place in the restaurant. The invention also includes a portable system preferably including a pump to distribute oil to the frying vat and a holding tank.

2 Claims, 3 Drawing Figures

COOKING OIL DISTRIBUTION AND GREASE COLLECTION AND DISPENSING APPARATUS AND METHOD

BACKGROUND OF THE INVENTION

This invention relates generally to apparatus and methods for collecting and dispensing cooking oil and grease for recycling or resale and particularly to apparatus and methods for collecting and dispensing cooking oil to and from fryer vats in restaurants and other industrial users of cooking oil for recycling or resale.

Restaurants typically fry potatoes, chicken and other food products in approximately 5 gallon frying vats at temperatures of about 375 degrees. The cooking oil or grease used in the fry vat typically weighs about 8 pounds per gallon. When it is necessary to replace the cooking oil or grease in the frying vat, personnel ordinarily manually pour the hot oil into containers, carry it out to a larger container in a refuse area for removal from the restaurant. It may be readily seen that manually transferring about 30-40 pounds of oil from each fryer at 375 degrees from the frying vat into another container and transporting it outside manually to deposit it in another receptacle is a dangerous task, which exposes personnel to risk of injury, creates health hazards and which concomitantly includes a risk of damage to expensive restaurant equipment.

In a typical collection system, a restaurant would place several of the containers outside the restaurant so that a delivery truck operator could conveniently collect the full drums of used oil or vacuum pump a fixed container. The heavy drums containing 30 gallons or more of oil are ordinarily manually handled to place them in a vehicle, such as a truck for transport to a collection center. Recycled cooking oil has many applications, including fat feed for pets and cattle and, reuse for cooking where permitted by local health codes and, therefore, has significant economic value.

Similarly, after emptying a frying vat, personnel ordinarily manually add new cooking oil from containers into the frying vat, which is always inconvenient and which also involves risks of splashing spillage and injury to restaurant personnel.

In addition to the safety considerations and inconvenience of manually emptying the hot frying vats into the barrel or fixed containers, it has been found that many restaurants have difficulty in maintaining sufficient security to prevent theft of the filled containers and its contents before authorized personnel are able to retrieve them for transport to the collection center. Since the value of the oil awaiting pickup for recycling at a single restaurant can be several hundred dollars per month, restaurant operators are motivated to provide adequate security to prevent theft. Thus, there exists a substantial need in the art for an improved apparatus and method which permits rapid and safe removal and storage of spent cooking grease and oil as well as rapid and safe distribution of new cooking oil into fryer vats.

SUMMARY OF THE INVENTION

The present invention provides a cooking oil delivery and grease reclamation apparatus and method which overcomes and alleviates the foregoing described difficulties in the prior art methods of collecting and storing frying oil or grease for delivery to and removal from a restaurant for cooking and recycling. The invention eliminates safety concerns associated with having personnel manually handle large quantities of hot liquids and prevents theft of the valuable reusable commodity. The invention further eliminates spillage and health hazards. Spilled grease on a floor attracts insects such as cockroaches and produces slick spots where a person could fall and suffer injury.

The apparatus of the invention may include a holding tank connected by suitable piping to each frying vat in a restaurant. The holding tank may be located at any elevation from the fryer so that opening a valve permits used oil or grease from the frying vat to flow into the holding tank. In some cases the flow of used oil from the frying vats into the holding tank may be assisted by a pump. A pipe extends from the holding tank to a location accessible for connection to a hose for input to a tank transported by a vehicle, such as a truck. The truck preferably has a vacuum pump attached thereto for pumping the liquid oil or grease from the holding tank into the truck tank. The outlet of the holding tank may conveniently be in a secure location to alleviate theft problems associated with storing the used oil in containers that may be easily removed from refuse areas.

The invention may also include a distribution tank mounted at an elevation above or below the frying vat. If necessary, a pump may be used to transfer the new oil into the frying vat. The truck operator, while the used oil or grease is being pumped into the truck tank, connects a hose from a second tank on the truck to pump new, fresh oil or grease into the distribution tank. The distribution tank includes a valve, which when opened, permits the new oil or grease to flow under the force of gravity from the distribution tank into the frying vat. The flow may be assisted by pump, nitrogen pressure or air where desirable or necessary.

The invention also may include a portable system as well as the stationary system for removing used cooking oil from a frying vat. The portable system includes a tank mounted upon a wheeled cart which personnel may position adjacent a frying vat to remove used cooking oil therefrom and then roll the filled tank away from the frying vat so that cooking operations may be resumed. The portable tank preferably includes a sensor for warning an operator when the tank is nearly full and a full indicator to inform the operator when the liquid level in the tank has reached its upper limit. The portable system further includes a conduit that may be used for both filling and purging the tank. The pump is preferably connected to the conduit and is controlled by an on/off switch and a purge switch that, when actuated, causes the pump to evacuate the tank.

The contents of the portable tank may be put into a larger holding tank for subsequent removal as described above, or the used cooking oil in the portable tank may be pumped into containers appropriately sized for manual handling.

DESCRIPTION OF THE PREFERRED EMBODIMENT

Figure 1:
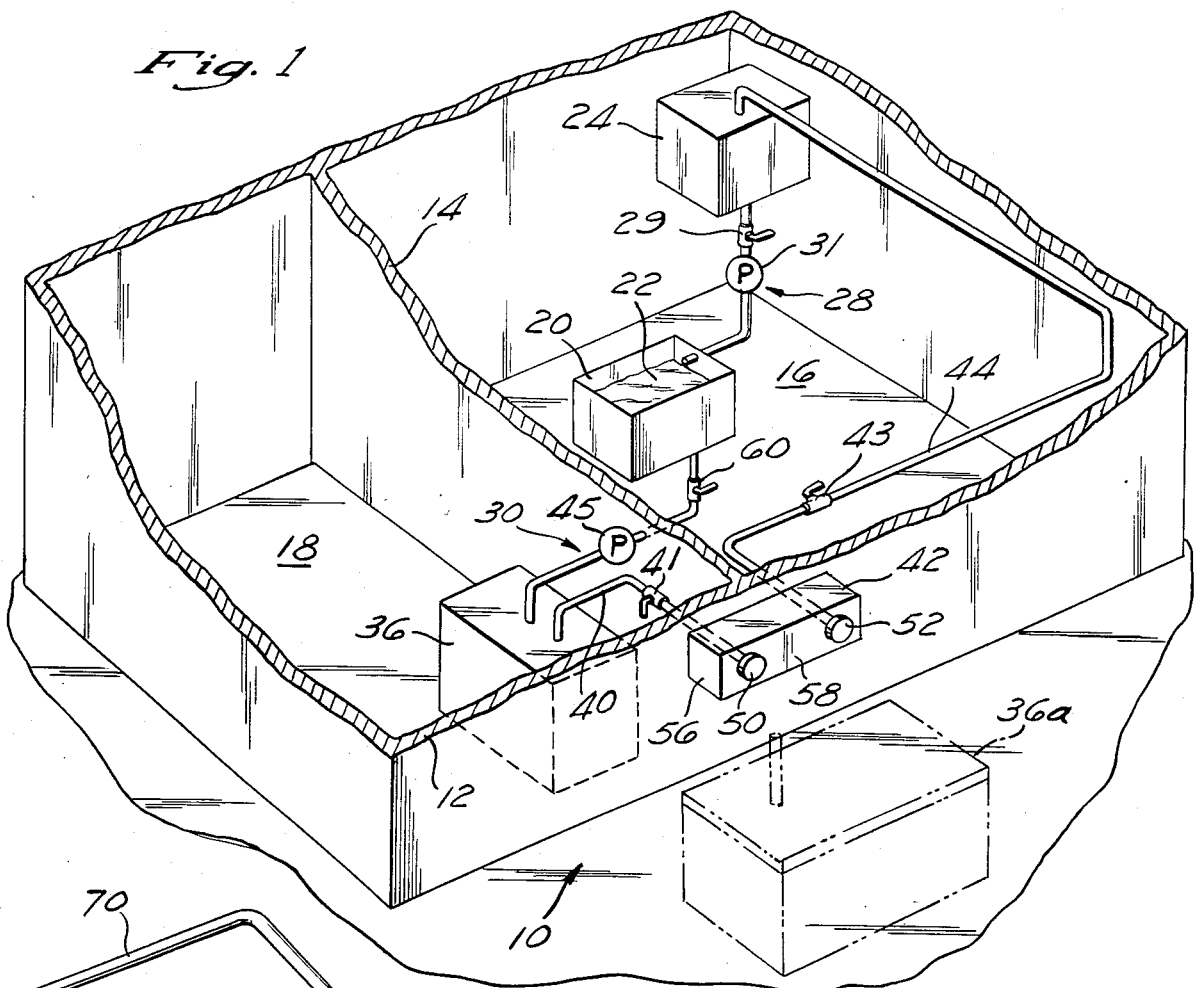
FIG. 1 is a perspective view of a cooking oil and grease collection and dispensing system installed in a building such as a restaurant.

Referring to FIG. 1, a building 10 includes an outer wall 12 and an inner wall 14 which forms two rooms 16 and 18. The room 16 represents, for example, the kitchen of a restaurant and the room 18 represents a storage room adjacent the kitchen 18.

The kitchen 16 contains a frying vat 20 therein for frying foods such as potatoes, onion rings or the like. The frying vat 20 is ordinarily formed of a material such as stainless steel and is formed to have a capacity of approximately 40 pounds of a suitable cooking oil 22. The frying grease in the vat 20 is heated to approximately 375 degrees while in use for preparing fried foods.

A dispensing tank 24 is mounted at any convenient elevation above or below that of the frying vat 20, preferably inside a storage room. The dispensing tank 24 may, for example, be mounted on the roof or within the attic (not shown) of the building 10. A piping system 28 extends between the dispensing tank 24 and the frying vat 20. The piping system 28 includes a valve 29, which regulates flow of cooking oil from the dispensing tank 24 to the frying vat 20. The piping system 28 may also include a pump 31 for controlling the flow rate of the new oil from the dispensing tank 24 to the frying vat 20.

A second piping system 30 extends from the bottom of the frying vat 20 to a storage tank 36, which may be located at any elevation convenient to the frying vat 20. The storage tank 36 may be positioned within a room adjacent the kitchen 16, or it may be positioned within the attic or storage area of the building or as an undergound tank 36a as shown in the phantom lines. A pipe 40 extends from the holding tank 36 to a distribution and collection station 42. A pipe 44 extends from the collection and distribution station 42 to the dispensing tank 24. Where necessary or desirable, a pump 45 in the piping system 30 removes the used oil from the vat 20 to the holding tank 36.

The collection and distribution station 42 includes a hose coupling 50 in fluid communication with the pipe 40 which leads from the storge tank 36 and a hose coupling 52 which is in fluid communication with the pipe 44 leading from the dispensing and distribution station 42 to the dispensing tank 24. The dispensing and distribution station 42 is preferably located outside the building 10 so that a vehicle such as a tank truck (not shown) may connect a hose (not shown) to the hose coupling 52 to pump new cooking oil into the dispensing tank 24 and to connect a hose (not shown) to the hose 50 coupling to pump the used cooking oil from the storage tank 36. Tank trucks having such pumps, hoses and suitable couplings are well known in the art and are not discussed in further detail herein. Since cooking oil has a density of about 8 pounds per gallon, a vacuum pump can lift the cooking oil a distance of about 33 feet from the level of the used oil in the holding tank to the level of the hose inlet in the tank truck from which the used oil is input thereto.

The collection and distribution station 42 may be inside the building 10, or it may advantageously be located inside a structure such as a metal box 56 having a lockable front access panel 58 sized to extend over and to prevent unauthorized access to the hose couplings 50 and 52, thereby alleviating the theft problem associated with the prior art. Manual shut off valves 41 and 43 may be installed on pipes 40 and 44, respectively, inside the building, at convenient places as a further theft deterrent.

After the grease 22 in the frying vat 20 has been sufficiently used that it should be replaced, a valve 60 in the pipe 30 leading from the frying vat 20 to the storage tank 36 is opened, the pump 45 is actuated thus permitting the used cooking oil to flow from the frying vat 20 into the storage tank 36. After the frying vat 20 is empty, the pump 45 is turned off and the valve 60 is closed, allowing the frying vat 20 to be cleaned if necessary.

The valve 29 between the dispensing tank 24 and the frying vat 20 is opened to permit a predetermined amount of fresh cooking oil to be drained or pumped by the pump 31 either by pressure or directly from the distribution tank 29 into the frying vat 20. After the desired amount of cooking oil is supplied to the frying vat 20, the pump 31 is deactivated, the valve 29 is closed; and cooking operations are resumed until it is necessary to change the cooking oil in the frying vat 20 again wherein the above described procedure can be repeated.

Figure 2:
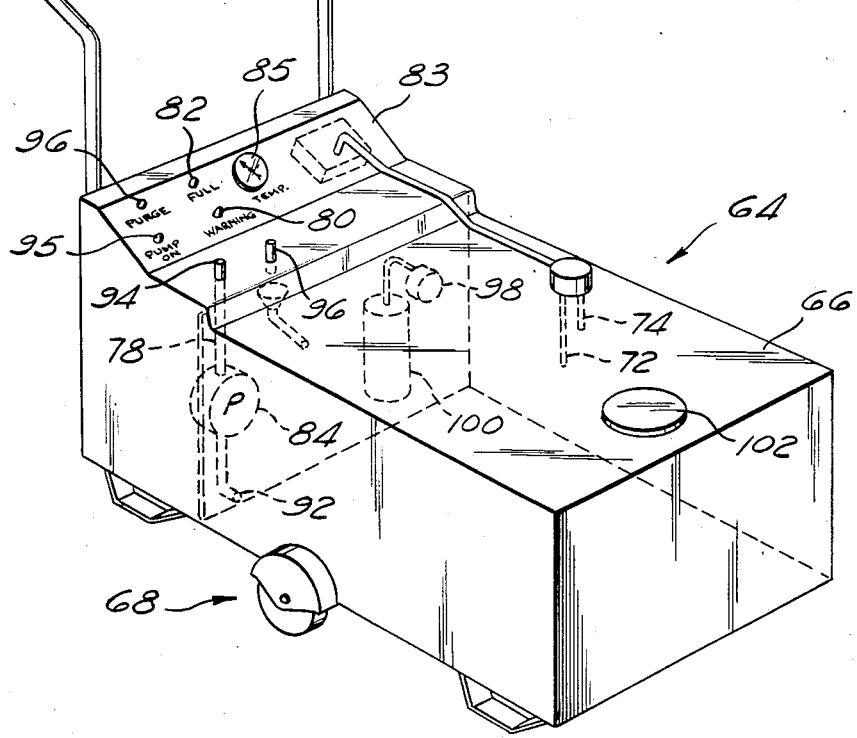
FIG. 2 illustrates a portable cooking oil and grease collection system according to the invention.

FIG. 2 is a perspective view of a portable system 64 according to the invention for removing used cooking oil from the frying vat 20. A tank 66 is mounted to a wheeled cart 68, which includes a handle 70 projecting therefrom to permit personnel to roll the cart 68 about to position it adjacent the frying vat 20 to remove grease therefrom and to roll the filled tank 66 away from the frying vat 20 so that cooking operations may be resumed.

A pair of sensors 72 and 74 are placed in the tank 66. The sensor 72 outputs a warning signal to warn an operator that the tank 66 is nearly full, and the sensor 74 indicates when the liquid level in the tank 66 has reached the upper limit. The warning signal turns on a warning light 80, and the signal from sensor 74 turns on a full indicator light 82. Both the warning light 80 and the full light 82 are preferably mounted in a panel 83 near the handle 70.

In order to remove used cooking oil from the frying vat 20, a suitable hose or pipe (not shown) is placed in the frying vat 20 and a pump 84, which is preferably electrically powered and carried on the cart 68 adjacent the tank 66, pumps the used cooking oil from the frying vat 20 through a conduit 78 for input to the tank 66. A temperature gauge 85 indicates the temperature of the grease being loaded into the tank 66.

The conduit 78 includes a first orifice 92 extending to a location adjacent the bottom of the tank 66 and a second orifice 94, which may be above the level of the tank 66 as shown in FIG. 2. The system 64 further includes an air line 96 that allows air to flow out of the tank 66 when during filling and permits air to flow into the tank 66 during purging operations. The system 64 includes an on/off switch 95 to selectively activate or deactivate the pump 84 and further includes a purge selector 96 to permit a user to set the pump 84 for either emptying the frying vat 20 or for purging the tank 66 of cooking oil.

The system 64 further includes a pressure relief valve 98 and a purge tank 100. The pressure relief valve 98 opens to admit pressurized fluids from the tank 66 into the purge tank 100 if the fluid pressure in the tank 66 exceeds a value that depends upon the structural strength of the tank 66 and associated components. The tank 66 further includes a cap 102 that may be manually removed to provide access to the interior of the tank 66 for cleaning.

Both the fixed system shown in FIG. 1 and the portable system shown in FIG. 2 prevent the theft and injury problem associated with the prior art. The fixed system requires only that an operator open the valve 60 and start pump 45 to remove used cooking oil from the frying vat 20 for storage into the storage tank 36. After the frying vat 20 is empty, and cleaned if necessary, the pump 45 is deactivated and the pump 31 in the distribution conduit is activated to fill the frying vat 20 with fresh cooking oil to a predetermined level. Therefore, neither emptying the frying vat 20 of used cooking oil nor filling it with fresh cooking oil exposes personnel to any risk of injury as in the prior art wherein the hot cooking oil must be manually transferred from the frying vat 20, which then must be manually filled with fresh cooking oil. Restaurant personnel need do no heavy lifting of containers and are not exposed to the risk of contact with hot cooking oil. The collection and distribution station are preferably in a secure location so that unauthorized personnel do not have access to the couplings 50 and 52. The storage tank 36 or 36A may be in a secure room or underground so that unauthorized personnel are unable to remove the cooking oil therefrom.

The portable system 64 also prevents risk of injury in transferring used cooking oil out of the frying vat. All that is required is for an operator to extend a suitable hose from the end 94 of the conduit 78 into the frying vat 20 and then actuate the on/off switch 95 to cause the pump 84 to pump the cooking oil 22 from the frying vat 20 into the tank 66. Since the cart 68 is mounted on wheels, it is not difficult for personnel to move the cart about as necessary to pump cooking oil from the frying vat 20. When the tank 66 is full, it is relatively easy for an operator to move the cart 68 as required to extend a hose from the end 94 of the conduit 78 into an inlet to a holding tank such as the tank 36 or 36A for subsequent removal through the conduit 40 and the coupling 50.

Figure 3:
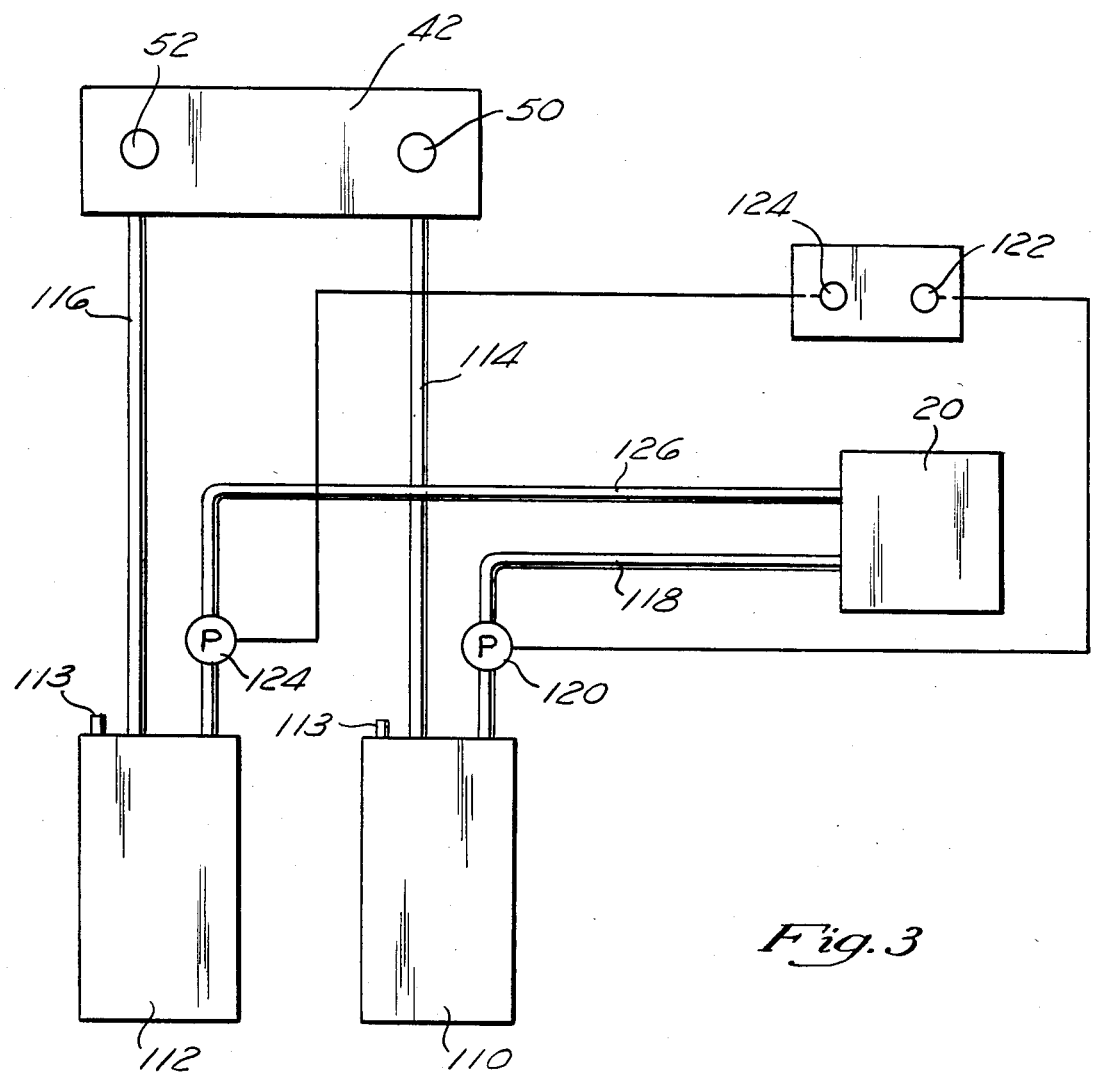
FIG. 3 illustrates an alternate arrangement for the distribution and holding tanks of the invention.

Referring to FIG. 3, the invention may also include a dispensing tank 110 and a holding tank 112 connected to the distribution and collection station 42 by suitable conduits 114 and 116, respectively. The conduits 114 and 116 terminate in the couplings 50 and 52, as explained above. A supply conduit extends from the dispensing tank 110 to the frying vat 20 to supply cooking oil thereto. The tanks 110 and 112 may be positioned at any convenient location inside or outside the structure 10. The tanks 110 and 112 are preferably above 14.5 inches in diameter and about 46inches in height. A particular installation may include a plurality of the tanks 110 and 112. A pump 120 actuated by a fill control switch 122 that is preferably adjacent the frying vat 20 forces the cooking oil into the frying vat 20. The switch 122 should be positioned so that a user may visually monitor the filling process and release the switch 122 when the frying vat 20 has been filled to a desired level. The tanks 110, 112 each have an airvalve 113 for allowing air flow necessary for filling and emptying operations.

After the cooking oil has been used sufficiently that it should be replaced, an operator actuates a purge switch 124 that is preferably near the fill control switch 122. A vacuum pump 124 connected in a conduit 126 between the holding tank 112 and the frying vat 20 forces the used cooking oil from the frying vat 20 into the holding tank 112.

Whenever the dispensing tank requires filling a truck (not shown) having large supply and collection tanks refills the dispensing tank 110 through the coupling 50 and empties the holding tank 112 through the coupling 52.

This invention is not limited to supplying a single frying vat 20. It is a simple matter to provide additional frying vats with the required conduits and switches so that one or more operators could alternately fill and empty a plurality of frying vats using a single pair of supply and holding tanks. The portable system 64 may also be used with the tanks 110 and 112.

What is claimed is:

1. A method of distributing cooking oil to a frying vat in a restaurant or the like and disposing of used cooking oil from the frying vat, comprising the steps of:
    providing a first tank separate and apart from the frying vat for receiving used cooking oil from the frying vat;
    placing the tank in selective fluid communication with the frying vat to remove the used cooking oil from the frying vat into the tank;
    providing a means for directly removing the used cooking oil to a location that is outside the restaurant or the like; said step of providing a means for directly removing the used cooking oil to a location outside the restaurant or the like comprising the steps of:
    connecting the tank to a distribution and collection station, and
    connecting a coupling to a conduit at the distribution and collection station so that the end of the conduit may be selectively opened to permit removal of the used cooking oil from the tank or sealed to retain the used cooking oil within the tank;
    providing a dispensing tank, separate and apart from said first tank, at an elevation above the frying vat;
    connecting a piping system between the dispensing tank and the frying vat;
    placing a pump in the piping system;
    placing a valve in the piping system; and
    selectively controlling the valve and pump to control the flow of cooking oil from the dispensing tank to the frying vat.

2. The method of claim 1 further including the step of:
    connecting a supply conduit between the dispensing tank and a distribution and collection station, said distribution and collection station providing direct access to the said dispensing tank from outside the restaurant or the like; and
    connecting a hose coupling at the distribution and collection station to provide means for selectively supplying cooking oil to the dispensing tank.

* * * * *